Patented Feb. 10, 1948

2,435,780

UNITED STATES PATENT OFFICE 2,435,780

ALKYL ESTERS OF α-CYANO-β-FURYLIDENE ACETIC ACID AS INSECT REPELLENTS

Ralph E. Heal, New Brunswick, N. J., assignor to Merck & Co., Inc., Rahway, N. J., a corporation of New Jersey No Drawing. Application October 27, 1943, Serial No. 507,891

3 Claims. (Cl. 167—30)

1

This invention relates to insect repellents, and its primary object is to provide substances of improved efficiency in repelling various insect pests, particularly mosquitoes.

In order to be satisfactory as an insect repellent, a substance, or composition of matter, selected for this purpose must possess a high degree of repellency which will be effective for prolonged periods of time. In addition, such agents must be non-toxic and otherwise harmless to the individuals treated. Many substances have been suggested for use as insect repellents, heretofore, but for one reason or another, have not been found entirely satisfactory. There is a pressing need in the art for an insect repellent which will be truly effective, and which will aid in obviating the incidence of untoward physiological effects which may be brought about by the transmittal of diseases through insect bites.

I have now discovered that lower alkyl esters of α-cyano-β-furylidene acetic acid, such as the ethyl, methyl esters, etc., are extremely effective insect repellents, when adapted according to my invention, and meet the stringent requirements of present day needs for such substances.

Insect repellents are most desirably applied to the individual to be treated in a carrier or base. I have discovered that when the alkyl esters of α-cyano-β-furylidene acetic acid are incorporated with certain commonly known carriers or vehicles which have been suggested, heretofore, for use with insect repellents, the activity of the esters is either lost altogether or seriously impaired. Therefore, it is a further object of our invention to provide especially selected carriers or solvents for such alkyl esters of α-cyano-β-furylidene acetic acid so that full benefit of the repellency properties of the esters is obtained. The selection of a solvent or carrier for such purposes is an important feature of my invention since the solvent or carrier markedly affects the efficacy of the α-cyano-β-furylidene acetic acid esters.

Solvents which have been shown by my tests to be admirably suited for my intended purposes are lower alkyl esters of polybasic acids, such as dimethyl phthalate, dimethyl adipate, and n-butyl citrate. In some instances the solvents may be used in combination. Thus, I have found that a mixture of dimethyl adipate and n-butyl citrate is highly suitable for use as a vehicle for lower alkyl esters of α-cyano-β-furylidene acetic acid.

I have found that compositions comprising the lower alkyl esters of α-cyano-β-furylidene acetic acid, and the lower alkyl esters of polybasic acids, as described, may employed with ease and efficiency in accordance with the methods described hereinafter. The repellent action of the furylidene acetic acid esters is unimpaired when solutions thereof in the solvents of the type described herein are utilized; in fact, the solvents have, themselves, to a certain degree, an insect repelling action, and their use in conjunction with the alkyl esters of α-cyano-β-furylidene acetic acid, in accordance with my invention, results in a synergistic effect so that a greater than additive effect as regards insect repellency is generally obtained in the resulting composition.

The lower alkyl esters of α-cyano-β-furylidene acetic acid are prepared, according to the process disclosed in Berichte 27, 2625 and Beilstein 17, 275 and illustrated by the reaction

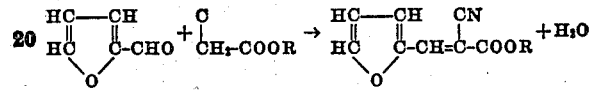

where R is lower alkyl.

The compositions of my invention are prepared by dissolving convenient amounts of the desired alkyl ester of α-cyano-β-furylidene acetic acid in the selected solvent. The volume of solvent employed may be varied; 10% solutions are usually satisfactory for producing a durable insect repelling action.

The advantages derived by employing the insect repellents of my invention include the provision of prolonged, effective repellency against insects, particularly mosquitoes. The described substances are all relatively non-volatile liquids and, unlike other substances, which have been previously suggested for use as repellents, such as the essential oils including citronella, these materials are almost odorless, or of an odor which is pleasing to human beings. Preparations comprising these materials do not exhibit an irritating effect upon the skin, and do not affect clothing adversely.

The repellent action of the compositions according to my invention has been determined by exhaustive tests. The method of performing these tests is as follows:

The test insect is the adult female mosquito Aëdes aegypti, which is four days old from the time of emergence. From emergence, to the period of testing, the mosquitoes have been fed on moist raisins, and have never received a blood meal.

One hundred female mosquitoes are placed in a cubical cage, 24 inches on edge, which is closed on the bottom and front, and enclosed on the remaining three sides and top by marquisette or a similar material.

The operator who is to make the test coats one arm from the wrist to the elbow with 0.6 cc. of the repellent mixture per 60 square inches, or 0.01 cc. per square inch. The material is spread over the arm by means of a pipette and then spread out by means of a glass rod which previously has been dipped into the mixture and allowed to drain.

When it is desired to take a reading, the untreated arm is inserted in the cage and waved about so as to stimulate the mosquitoes, but they are not permitted to feed on it. As soon as the majority of the mosquitoes are activated, the arm is held still for one minute, and the number of bites determined which gives the bite rate at the start. The treated arm is then inserted into the cage, with the entire treated area exposed and kept still for five minutes. The first reading is made one hour after applying the material to the arm. Subsequent readings are taken at ½ hour intervals until the breakpoint is obtained. The breakpoint is taken as the first breaking of the skin by the mosquito, but which is confirmed by penetrations on two successive half-hour interval tests. The time required for the breakpoint, and confirmation thereof, is taken as the period of "complete protection" against insect attack. The use of the preparations of my invention also furnishes a period of "partial protection" against insect attack, which may be defined as that period of time subsequent to the "complete protection" period, during which the operator does not get more than five brief penetrations by the mosquitoes during a five-minute test period. A brief penetration may be described as that penetration experienced when the mosquito attempts to sink his proboscis into the skin but is repelled after having penetrated only through the outer layer of skin. A deep penetration occurs when the mosquito sinks his proboscis into the skin to such a depth that his head becomes lower than the remainder of his body.

Table I illustrates the results obtained by testing $\alpha$-cyano-$\beta$-furylidene acetic acid ethyl ester in a number of especially selected vehicles against the mosquito *Aëdes aegypti*, in the manner heretofore described.

Table I

| Solvent and Conc. | Complete Protection, Hours |
|---|---|
| Ethyl cinnamate—10% | 9 |
| Dimethyl phthalate—17.5% | 13.5 |
| "Indalone"—10% | 10 |
| Dimethyl adipate+n-butyl citrate (1:1)—10% | 7.5 |

("Indalone" is essentially the compound $\alpha,\alpha$-dimethyl-$\alpha'$-carbobutoxy-$\alpha,\beta$-dihydro-gamma-pyrone.)

When a composition comprising 10% of the ethyl ester of $\alpha$-cyano-$\beta$-furylidene acetic acid in a mixture of dimethyl adipate and n-butyl citrate (1:1) was tested under actual trial conditions for repellency against the Adirondack black fly (*Prosimulium hirtipes*) and the whitestocking black fly (*Simulium venustum*) it was found to afford 5.5 hours of "complete protection" on one trial and 3.5 hours of "complete protection" on another trial under more severe conditions. The same composition was tested under actual trial conditions against punkies (*Culicoides sp.*) and it afforded 6 hours of "complete protection."

The effectiveness of my insect repellent compositions has been compared with that of other substances previously suggested for such use. Under the conventional test conditions first described herein against *Aëdes aegypti*, such previously suggested insect repellents gave results as set forth in Table II below.

Table II

| Material Tested | Complete Protection, Hours |
|---|---|
| Butyl carbitol acetate | 3 |
| "Indalone" | 3.5 |
| "Everready Insect Repellent Formula 612" | 5.5 |
| Dimethyl phthalate | 7.5 |

(The active ingredient of "Everready Insect Repellent Formula 612" is 2-ethylhexanediol-1,3.)

It will be apparent from the foregoing experimental results that the preparations according to my invention possess unusual properties, and that they are peculiarly efficacious when used as insect repellents.

Modifications may be made in carrying out the present invention without departing from the spirit and scope thereof, and I am to be limited only by the appended claims.

I claim:
1. An insect repellent comprising a solution of $\alpha$-cyano-$\beta$-furylidene-actic acid ethyl ester in a di-lower alkyl phthalate.
2. An insect repellent comprising a solution of $\alpha$-cyano-$\beta$-furylidene-acetic acid ethyl esther in dimethyl phthalate.
3. An insect repellent comprising a solution of about 17.5% of $\alpha$-cyano-$\beta$-furylidene-acetic acid ethyl ester in dimethyl phthalate.

RALPH E. HEAL.

REFERENCES CITED

The following references are of record in the file of this patent:

Industrial Solvents by Mellan 1939 ed., page 423. (Copy in Div. 50.)

Beilstein V. 18 (1934) ed., page 338. (Copy in Div. 6.)